United States Patent
Chan et al.

(10) Patent No.: US 10,705,586 B2
(45) Date of Patent: Jul. 7, 2020

(54) POWER DISTRIBUTION APPARATUS AND METHOD OF OPERATING THE SAME

(71) Applicant: Delta Electronics, Inc., Taoyuan (TW)

(72) Inventors: Chih-Chiang Chan, Taoyuan (TW); Wen-Hsiang Lin, Taoyuan (TW); Chin Lien, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 332 days.

(21) Appl. No.: 15/689,978

(22) Filed: Aug. 29, 2017

(65) Prior Publication Data
US 2018/0232030 A1    Aug. 16, 2018

(30) Foreign Application Priority Data

Feb. 14, 2017 (CN) .......................... 2017 1 0078117

(51) Int. Cl.
*G06F 1/30* (2006.01)
*H02J 7/00* (2006.01)
*G06F 1/26* (2006.01)

(52) U.S. Cl.
CPC .................. *G06F 1/30* (2013.01); *G06F 1/26* (2013.01); *H02J 7/0068* (2013.01); *H02J 7/00034* (2020.01); *H02J 7/0048* (2020.01); *H02J 2007/0067* (2013.01); *Y02B 40/90* (2013.01)

(58) Field of Classification Search
CPC ...... H02J 7/00; H02J 1/00; H02H 3/00; G06F 1/00

USPC .......................................................... 307/20
See application file for complete search history.

(56) References Cited

U.S. PATENT DOCUMENTS

| | | | |
|---|---|---|---|
| 5,412,529 A * | 5/1995 | Eaton ................. | H01R 13/6666 361/90 |
| 2005/0206241 A1* | 9/2005 | Saxena ..................... | H02J 9/06 307/66 |
| 2006/0043792 A1* | 3/2006 | Hjort ....................... | H02J 9/062 307/1 |
| 2006/0290327 A1* | 12/2006 | Lee ......................... | G06F 1/263 323/210 |
| 2009/0261789 A1* | 10/2009 | Chang ................... | H02M 5/458 323/234 |
| 2015/0194839 A1* | 7/2015 | Wojcik .................. | H01M 10/46 320/108 |
| 2015/0229127 A1* | 8/2015 | Wendt ...................... | H02J 1/10 307/43 |

(Continued)

*Primary Examiner* — Rexford N Barnie
*Assistant Examiner* — Joseph N Inge
(74) *Attorney, Agent, or Firm* — Hauptman Ham, LLP

(57) ABSTRACT

A power distribution apparatus with a backup energy-storing function receives a first input power source, and the apparatus includes an output module, a conversion module, an energy storage unit, and a management unit. When the first input power source is normal, the output module outputs the first input power source. Also, the management unit controls the conversion module to convert the first input power source to a first power source for charging the energy storage unit. When the first input power source is abnormal, the energy storage unit outputs a second power source to the conversion module. Also, the management unit controls the conversion module to convert the second power source into a second input power source for outputting the second input power source from a second output module.

20 Claims, 9 Drawing Sheets

(56) References Cited

U.S. PATENT DOCUMENTS

2016/0197504 A1\* 7/2016 Hsia .................. H02J 9/062
307/23

\* cited by examiner

POWER DISTRIBUTION APPARATUS AND METHOD OF OPERATING THE SAME

BACKGROUND

Technical Field

The present disclosure relates generally to a power distribution apparatus and a method of operating the same, and more particularly to a power distribution apparatus with a backup energy-storing function and a method of operating the same.

Description of Related Art

A power distribution apparatus is used to supply power to computers/servers and a storage system of a rack mounted server. With the progress of computer technology and the rapid development of Internet, data centers, also called server farms, which house a plurality of computers or servers are quickly developed and growing. In order to provide more services and benefits, an increasing number of computers or servers in the data center is necessary. However, issues of power supply, power distribution, and power management are unavoidable. Accordingly, the power distribution apparatus plays a key role for distributing power of the computers and/or servers of the rack mounted server to solve the issues of power supply, power distribution, and power management.

In general, the power distribution apparatuses are classified into two types: dump-type and intelligent-type power distribution apparatuses. The dump-type power distribution apparatus are only provided to supply power to computers and/or servers. The intelligent-type power distribution apparatuses are provided to supply power to computers and/or servers and monitor and measure power operations via remote network. Accordingly, the connection relationship between all power distribution apparatuses and the computers and/or servers is managed and monitored so as to optimize the power usage efficiency of the data center.

Since most of the existing power distribution apparatuses are not equipped with backup power mechanism, the power distribution apparatus would fail to supply power to the back-end loads once the input power source is interrupted.

SUMMARY

In order to solve the above-mentioned problem, the present disclosure provides a power distribution apparatus. The power distribution apparatus includes a first output module, a second output module, a conversion module, an energy storage unit, and a management unit. The first output module receives a first input power source. The second output module is connected to the first output module, and receives the first input power source. The conversion module is connected to the first output module and the second output module, and receives the first input power source. The energy storage unit is connected to the conversion module. The management unit is connected to the first output module, the second output module, the conversion module, and the energy storage unit. When the first input power source is normal, the first input power source is outputted from the first output module and the second output module, and the management unit controls the conversion module to convert the first input power source into a first power source for charging the energy storage unit. When the first input power source is abnormal, the energy storage unit outputs a second power source to the conversion module, and the management unit controls the conversion module to convert the second power source into a second input power source for outputting the second input power source from the second output module.

In one embodiment, the conversion module further includes a first conversion unit and a second conversion unit. The first conversion unit is connected to the energy storage unit and receives the first input power source. The second conversion unit is connected between the energy storage unit and the second output module. The first conversion unit converts the first input power source into the first power source for charging the energy storage unit, and the second conversion unit converts the second power source into the second input power source and transmit the second input power source to the second output module.

In one embodiment, the second conversion unit is a DC-to-DC converter or a DC-to-AC converter; when the second conversion unit is the DC-to-DC converter and the first input power source is abnormal, the second conversion unit converts the second power source into a DC second input power source and transmit the DC second input power source to the second output module; when the second conversion unit is the DC-to-AC converter and the first input power source is abnormal, the second conversion unit converts the second power source into an AC second input power source or a modulated AC second input power source and transmit the AC second input power source or the modulated AC second input power source to the second output module.

In one embodiment, the second conversion unit includes a DC-to-DC converter and a DC-to-AC converter, and the management unit sets that the second input power source is a DC second input power source, an AC second input power source, or a modulated AC second input power source; when the first input power source is abnormal, the second conversion unit transmits the DC second input power source, the AC second input power source, or the modulated AC second input power source to the second output module.

In one embodiment, the first conversion unit is a bidirectional AC-to-DC converter; when the first input power source is abnormal, the first conversion unit converts the second power source into an AC third input power source and transmit the AC third input power source to the first output module.

In one embodiment, the power distribution apparatus further includes a first switch and a second switch. The first switch is connected to the first output module and the first conversion unit, and receives the first input power source. The second switch is connected between the second output module and the second conversion unit. When the first input power source is normal, the first switch is turned on and the second switch is turned off, and the first input power source is outputted from the first output module and the second output module; when the first input power source is abnormal, the first switch is turned off so that the first output module disconnects from the first input power source, and the second switch is turned on so that the second input power source is transmitted to the second output module through the second switch.

In one embodiment, the first output module further includes a plurality of first output ports, a first control unit, a plurality of detection units, and a plurality of first switch units. The first control unit is connected to the management unit. The detection units are correspondingly connected between the first output ports and the first control unit. The first switch units are correspondingly connected between the first output ports and the first control unit. The detection units detect information of the first input power source at the first output ports, the first control unit converts the information of the first input power source into first power source information and output the first power source information to the management unit, and the management unit turns on or turn off the first switch units according to the first power source information.

In one embodiment, the second output module further includes a plurality of second output ports, a second control unit, a plurality of detection units, and a plurality of second switch units. The second control unit is connected to the management unit. The detection units are correspondingly connected between the second output ports and the second control unit. The second switch units are correspondingly connected between the second output ports and the second control unit. The detection units detect information of the first input power source at the second output ports, the second control unit converts the information of the first input power source into second power source information and output the second power source information to the management unit, and the management unit turns on or turn off the second switch units according to the second power source information.

In one embodiment, the power distribution apparatus further includes a user-customized unit. The user-customized unit is connected to the management unit and sets a power quality of the first input power source; the management unit determines that a status of the first input power source according to the power quality.

In one embodiment, the power quality includes an upper voltage threshold value, a lower voltage threshold value, an upper current threshold value, a phase difference value, a power factor value, an upper frequency threshold value, and a lower frequency threshold value of the first input power source.

In one embodiment, the energy storage unit outputs energy storage information to the management unit, and the management unit turns off the first conversion unit and the second conversion unit when the management unit determines that the energy storage unit fails, in a temperature abnormality, or in a voltage abnormality according to the energy storage information.

In one embodiment, the power distribution apparatus includes a housing. The housing contains the first output module, the second output module, the conversion module, and the management unit; wherein the housing has a containing space for containing and replacing or expanding the energy storage unit.

In one embodiment, the energy storage unit is a pluggable energy storage unit.

In one embodiment, the power distribution apparatus includes a transmission unit. The transmission unit is connected to the management unit, and transmits information of the management unit or monitor and control the management unit.

In order to solve the above-mentioned problem, the present disclosure provides a method of operating a power distribution apparatus. The power distribution apparatus controls power output from a first output module and a second output module of the power distribution apparatus according to a status of a first input power source. The method includes steps of: (a) outputting the first input power source from the first output module and the second output module when the power distribution apparatus detects that the first input power source is normal; (b) converting the first input power source into a first power source by the power distribution apparatus for charging an energy storage unit; (c) controlling the first output module not to output the first input power source by the power distribution apparatus when the power distribution apparatus detects that the first input power source is abnormal; (d) converting a second power source provided from the energy storage unit into a second input power source by the power distribution apparatus for outputting the second input power source from the second output module.

In one embodiment, the step (d) further includes: (d1) converting the second power source provided from the energy storage unit into a DC second input power source by a second conversion unit and outputting the DC second input power source from the second output module when the first input power source is abnormal; or converting the second power source provided from the energy storage unit into the an AC second input power source or a modulated AC second input power source by a second conversion unit and outputting the AC second input power source or the modulated AC second input power source from the second output module when the first input power source is abnormal.

In one embodiment, the step (d) further includes: (d2) converting the second power source provided from the energy storage unit into a DC second input power source, an AC second input power source, or a modulated AC second input power source according to a setting of a management unit by a second conversion unit, and outputting the DC second input power source, the AC second input power source, or the modulated AC second input power source from the second output module when the first input power source is abnormal.

In one embodiment, after the step (c) further includes: (c1) converting the second power source into an AC third input power source by a first conversion unit and outputting the AC third input power source from the first output module when the first input power source is abnormal.

In one embodiment, the power distribution apparatus turns off the first conversion unit and the second conversion unit when the power distribution apparatus determines that the energy storage unit fails, in a temperature abnormality, or in a voltage abnormality according to the energy storage information.

In one embodiment, the power distribution apparatus includes a user-customized unit, and the user-customized unit sets a power quality of the first input power source; the management unit determines the status of the first input power source according to the power quality; the power quality includes an upper voltage threshold value, a lower voltage threshold value, an upper current threshold value, a phase difference value, a power factor value, an upper frequency threshold value, and a lower frequency threshold value of the first input power source.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
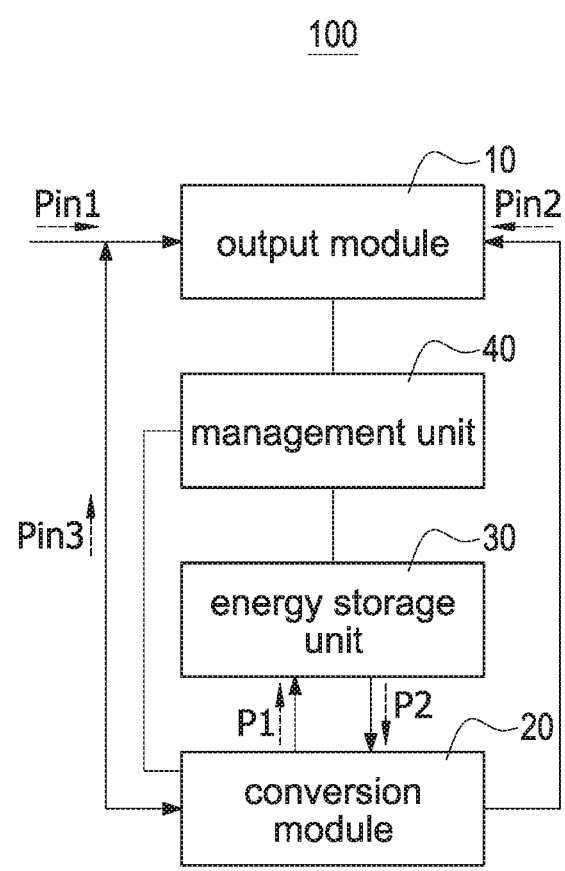
FIG. 1 is a schematic circuit architecture diagram of a power distribution apparatus according to the present disclosure.

Reference will now be made to the drawing figures to describe the present disclosure in detail. It will be understood that the drawing figures and exemplified embodiments of present disclosure are not limited to the details thereof.

Referring to FIG. 1, this figure shows a schematic circuit architecture diagram of a power distribution apparatus according to the present disclosure. The power distribution apparatus 100 includes an output module 10, a conversion module 20, an energy storage unit 30, and a management unit 40. The output module 10 receives a first input power source Pin1, and the output module 10 is connected a plurality of loads (not shown). The conversion module 20 is connected to the output module 10 and the energy storage unit 30. The conversion module 20 converts the first input power source Pin1 into a first power source P1, and the first power source P1 is provided to charge the energy storage unit 30. The energy storage unit 30 provides a second power source P2 to the conversion module 20. The conversion module 20 converts the second power source P2 into a second input power source Pin2 and a third input power source Pin3, and the second input power source Pin2 and the third input power source Pin3 are transmitted to the output module 10. The management unit 40 is connected between any two of the output module 10, the conversion module 20, and the energy storage unit 30. The management unit 40 determines whether the first input power source Pin1 is normal or not so as to control the output module 10 outputting the first input power source Pin1, or the second input power source Pin2 and the third input power source Pin3. The management unit 40 further detects a status of the energy storage unit 30 so as to control whether the conversion module 20 converts the first input power source Pin1 into the first power source P1, converts the second power source P2 into the second input power source Pin2, and converts the second power source P2 into the third input power source Pin3.

Figure 2:
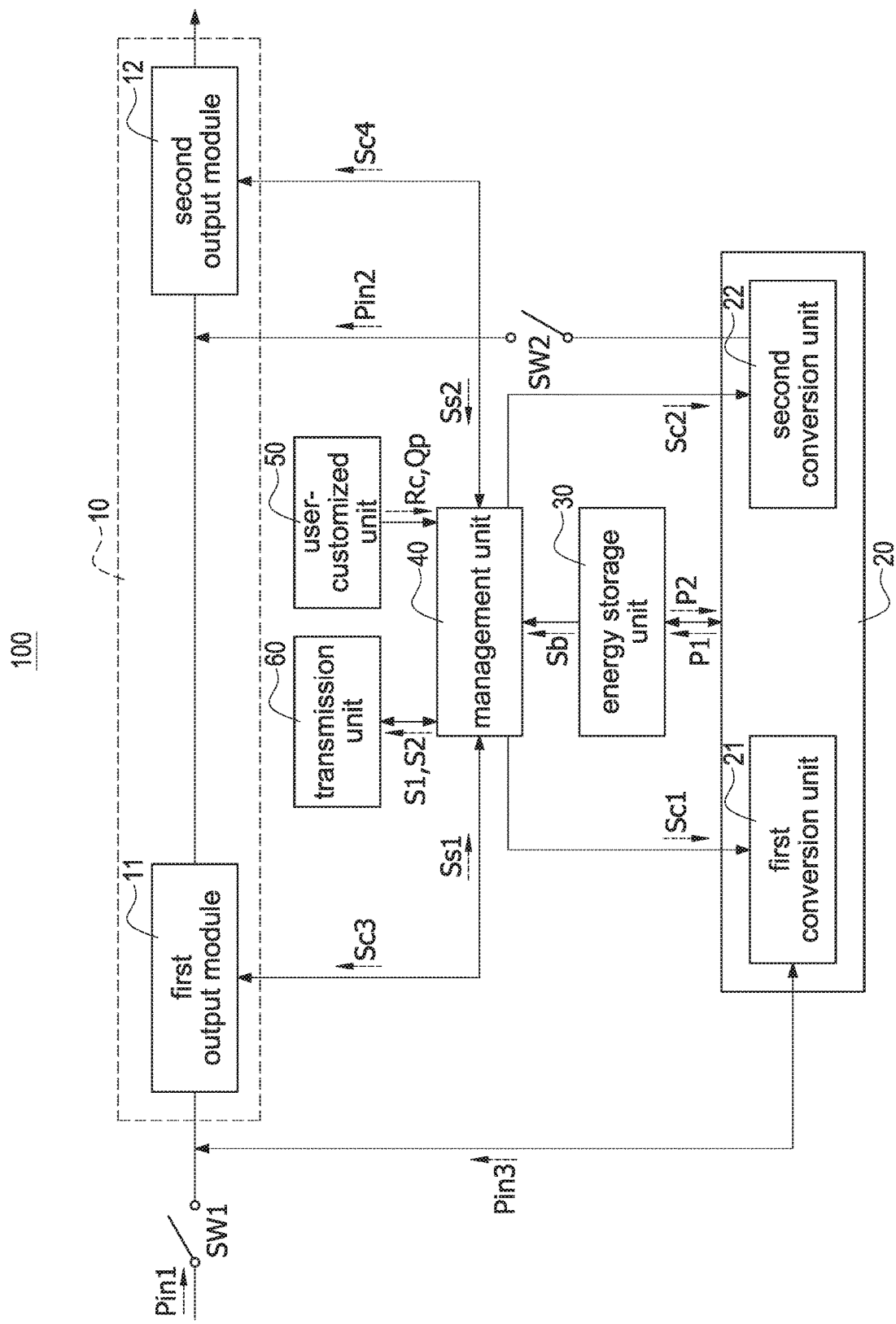
FIG. 2 is a schematic circuit block diagram of the power distribution apparatus according to the present disclosure.

Referring to FIG. 2, this figure shows a schematic circuit block diagram of the power distribution apparatus according to the present disclosure. The output module 10 includes a first output module 11 and a second output module 12. When the management unit 40 determines that the first input power source Pin1 is normal, the first input power source Pin1 is outputted from the first output module 11 and the second output module 12. Also, the conversion module 20 is controlled by the management unit 40 to convert the first input power source Pin1 into the first power source P1 for charging the energy storage unit 30. When the management unit 40 determines that the first input power source Pin1 is abnormal, the conversion module 20 is controlled by the management unit 40 to convert the second power source P2 into the second input power source Pin2 and the third input power source Pin3. Also, the third input power source Pin3 is outputted from the first output module 11, and the second input power source Pin2 is outputted from the second output module 12. The detailed operation of the conversion module 20 controlled by the management unit 40 according to the status of the energy storage unit 30 will be described hereinafter. In one example, an input power source, which is received by the output module 10 and the conversion module 20, may be a three-phase power source or a single-phase power source. Also, an output power source, which is outputted from the output module 10, for example but not limited to, a single-phase power source, namely, the output power source may be a three-phase power source.

As shown in FIG. 1 and FIG. 2, the conversion module 20 includes a first conversion unit 21 and a second conversion unit 22. The first conversion unit 21 is connected to the energy storage unit 30. The first conversion unit 21 converts the first input power source Pin1 into the first power source P1 for charging the energy storage unit 30. Also, the first conversion unit 21 converts the second power source P2 outputted from the energy storage unit 30 into the third input power source Pin3, and the third input power source Pin3 is outputted from the first output module 11. The second conversion unit 22 is connected between the energy storage unit 30 and the second output module 12. The second conversion unit 22 converts the second power source P2 into the second input power source Pin2, and the second input power source Pin2 is outputted from the second output module 12. When the first input power source Pin1 is normal, the first conversion unit 21 converts the first input power source Pin1 into the first power source P1 for charging the energy storage unit 30. In contrast, when the first input power source Pin1 is abnormal, the first conversion unit 21 converts the second power source P2 outputted from the energy storage unit 30 into the third input power source Pin3, and the third input power source Pin3 is outputted from the first output module 11. Also, the second conversion unit 22 converts the second power source P2 into the second input power source Pin2, and the second input power source Pin2 is outputted from the second output module 12.

In one example, the first conversion unit 21 may be a bidirectional AC-to-DC converter. When the first input power source Pin1 is normal, the first conversion unit 21 converts an AC first input power source Pin1 into a DC first power source P1 for charging the energy storage unit 30. In contrast, when the first input power source Pin1 is abnormal, the first conversion unit 21 converts a DC second power source P2 outputted from the energy storage unit 30 into an AC third input power source Pin3, and the third input power source Pin3 is outputted from the first output module 11.

In one embodiment, the second conversion unit 22 is a DC-to-DC converter or a DC-to-AC converter. When the second conversion unit 22 is the DC-to-DC converter and the first input power source Pin1 is abnormal, the second conversion unit 22 converts a DC second power source P2 into a DC second input power source Pin2, and the second input power source Pin2 is outputted from the second output module 12. When the second conversion unit 22 is the DC-to-AC converter and the first input power source Pin1 is abnormal, the second conversion unit 22 converts the DC second power source P2 into an AC second input power source Pin2 or a modulated AC second input power source Pin2, and the second input power source Pin2 is outputted from the second output module 12.

In another embodiment, the second conversion unit 22 includes a DC-to-DC converter and a DC-to-AC converter. The management unit 40 set that the second input power source Pin2 is a DC second input power source, an AC second input power source, or a modulated AC second input power source. When the second input power source Pin2 is set by the management unit 40 to be the DC second input power source, the DC-to-DC converter of the second conversion unit 22 converts the DC second power source P2 into the DC second input power source Pin2, and the DC second input power source Pin2 is outputted from the second output module 12. When the second input power source Pin2 is set by the management unit 40 to be the AC second input power source or the modulated AC second input power source, the DC-to-AC converter of the second conversion unit 22 converts the DC second power source P2 into the AC second input power source or the modulated AC second input power source, and the AC second input power source or the modulated AC second input power source is outputted from the second output module 12. In other words, the second conversion unit 22 converts the second power source P2 into the desired DC, AC, or modulated AC second input power source set by the management unit 40, and the desired DC, AC, or modulated AC second input power source is outputted from the second output module 12.

Accordingly, the DC-to-DC converter, the DC-to-AC converter, or the combination of the DC-to-DC converter and the DC-to-AC converter may be designed as the second conversion unit 22 based on the desired types of power sources for loads (not shown), thereby providing flexible and adaptive operations for different types of loads connected to the power distribution apparatus 100. In one example, the management unit 40 outputs a first control signal Sc1 and a second control signal Sc2, and the first conversion unit 21 is controlled by the first control signal Sc1 and the second conversion unit 22 is controlled by the second control signal Sc2. For example, the management unit 40 outputs the first control signal Sc1 to control the first conversion unit 21 for converting the first input power source Pin1 into the first power source P1 when the management unit 40 detects the first input power source Pint. In another example, the first conversion unit 21 is controlled by a controller (not shown) inside the first conversion unit 21 and the second conversion unit 22 is controlled by a controller (not shown) inside the second conversion unit 22. For example, the first conversion unit 21 directly converts the first input power source Pin1 into the first power source P1 when the controller inside the first conversion unit 21 detects the first input power source Pin1.

As shown in FIG. 1 and FIG. 2, the power distribution apparatus 100 further includes a user-customized unit 50. The user-customized unit 50 is connected to the management unit 40. The user-customized unit 50 is used to set a power quality Qp of the first input power source Pin1. According to user requirements, the power quality Qp is customized and the power quality Qp has to meet default factory settings of the power distribution apparatus 100. If the power quality Qp is not set by a user through the user-customized unit 50, the power quality Qp is decided by default factory settings. In contrast, if the power quality Qp is set by the user, the power quality Qp is decided by the user's settings and the power quality Qp has to meet default factory settings of the power distribution apparatus 100. The power quality Qp includes, for example but not limited to, an upper voltage threshold value, a lower voltage threshold value, an upper current threshold value, a phase difference value, a power factor value, an upper frequency threshold value, and a lower frequency threshold value of the first input power source Pin1. The user-customized unit 50 provides the power quality Qp to the management unit 40. The management unit 40 determines whether the first input power source Pin1 according to the power quality Qp is set by the user-customized unit 50. When the management unit 40 determines that the voltage, current, phase, power factor, and frequency of the first input power source Pin1 meet the power quality Qp, the first input power source Pin1 is outputted from the first output module 11 and the second output module 12. Also, the first conversion unit 21 converts the first input power source Pin1 into the first power source P1 for charging the energy storage unit 30. When the management unit 40 determines that any one of the voltage, current, phase, power factor, and frequency of the first input power source Pin1 fails to meet the power quality Qp, the first conversion unit 21 converts the second power source P2 into the third input power source Pin3 for outputting the third input power source Pin3 from the first output module 11, and the second conversion unit 22 converts the second power source P2 into the second input power source Pin2 for outputting the second input power source Pin2 from the second output module 12.

For example, it is assumed that the power quality Qp is not set by a user through the user-customized unit 50, and default factory settings of the power quality Qp may be: the upper/lower voltage threshold values are set as within AC 110±10% volts, the upper current threshold value is set as 15 Amperes, the phase difference value is set as within 10%, the power factor value is set as greater than or equal to 0.7, and the upper/lower frequency threshold values are set as within 60±10% Hertzs. When the management unit 40 determines that the voltage, current, phase, power factor, and frequency of the first input power source Pin1 meet the above-mentioned factory settings of the power quality Qp, the first input power source Pin1 is outputted from the first output module 11 and the second output module 12, and the first conversion unit 21 converts the first input power source Pin1 into the first power source P1 for charging the energy storage unit 30. In contrast, when the management unit 40 determines that any one of the voltage, current, phase, power factor, and frequency of the first input power source Pin1 fails to meet the above-mentioned factory settings of the power quality Qp, for example, the voltage of the first input power source Pin1 is AC 60 volts, the first input power source Pin1 is not outputted from the first output module 11 and the second output module 12. At this time, the second input power source Pin2 and the third input power source Pin3 are outputted from the second output module 12 and the first output module 11, respectively. In another example, it is assumed that the power quality Qp is set by the user, for example, the upper/lower voltage threshold values are set as within AC 110±5% volts. When the voltage of the first input power source Pin1 is AC 103 volts, the management unit 40 determines that the first input power source Pin1 is abnormal.

In another example, the user-customized unit 50 is not limited to be installed and connected outside the management unit 40. In other words, the user-customized unit 50 may be integrated inside the management unit 40. In addition, different power qualities Qp may be set by the user-customized unit 50 for the first output module 11 and the second output module 12. For example, a first power quality is set for the first output module 11 and a second power quality is set for the second output module 12. It is assumed that a power factor of the first power quality is set as greater than or equal to 0.7 and a power factor of the second power quality is set as greater than or equal to 0.8. When the power factor of the first input power source Pin1 is 0.75, the management unit 40 determines that the first input power factor Pin1 meets the first power quality of the first output module 11 but fails to meet the second power quality of the second output module 12. Accordingly, the management unit 40 controls the first output module 11 to continue to output the first input power source Pin1 and controls the second conversion unit 22 to converter the second power source P2 into the second input power source Pin2 and output the second input power source Pin2 from the second output module 12.

As shown in FIG. 1 and FIG. 2, the energy storage unit 30 is connected to the management unit 40. The management unit 40 provides energy storage information Sb to the management unit 40. The management unit 40 determines the quality of the energy storage unit 30 to provide a protection mechanism for the energy storage unit 30 according to the energy storage information Sb. For example, the energy storage information Sb includes a temperature value, a voltage value, and an operating status of the energy storage unit 30. The management unit 40 measures an internal resistance, a condition of a fixed-time discharge, a capacity, and times of charge and discharge of the energy storage unit 30 so as to determine whether the energy storage unit 30 fails. Also, the management unit 40 detects temperature values and voltage values of the energy storage unit 30 during the charge and discharge process so as to determine whether the energy storage unit 30 fails.

The management unit 40 outputs the first control signal Sc1 and the second control signal Sc2 according to the energy storage information Sb. The first control signal Sc1 is provided to control the first conversion unit 21 and the second control signal Sc2 is provided to control the second conversion unit 22. When the management unit 40 determines that the energy storage unit 30 fails according to the energy storage information Sb during the operation of the power distribution apparatus 100, the first control signal Sc1 outputted from the management unit 40 is provided to turn off the first conversion unit 21 and the second conversion unit 22. When the management unit 40 determines that the temperature value or the voltage value of the energy storage unit 30 is abnormal according to the energy storage information Sb when the energy storage unit 30 is charged by the first power source P1 outputted from the first conversion unit 21, the first control signal Sc1 outputted from the management unit 40 is provided to turn off the first conversion unit 21 to stop outputting the first power source P1 to the energy storage unit 30. When the management unit 40 determines that the temperature value or the voltage value of the energy storage unit 30 is abnormal according to the energy storage information Sb during the conversion of the second power source P2 into the second input power source Pin2 and the third input power source Pin3, the first control signal Sc1 outputted from the management unit 40 is provided to turn off the first conversion unit 21 to stop outputting the third input power source Pin3, and the second control signal Sc2 outputted from the management unit 40 is provided to turn off the second conversion unit 22 to stop outputting the second input power source Pin2. When the management unit 40 determines that the energy storage unit 30 fails according to the energy storage information Sb, the management unit 40 outputs a first alerting signal S1 to notify the user that the energy storage unit 30 fails. In other words, when the management unit 40 determines that the energy storage unit 30 fails according to the energy storage information Sb, the management unit 40 turns off the first conversion unit 21 and the second conversion unit 22 and outputs the first alerting signal S1. The energy storage unit 30 is provided to store electricity. In one example, the energy storage unit 30, for example but not limited to, is a battery. In addition, the energy storage information Sb further provides other information for the management unit 40 besides detections in temperature abnormality and voltage abnormality.

As shown in FIG. 1 and FIG. 2, the power distribution apparatus 100 further includes a first switch SW1 and a second switch SW2. The first switch SW1 is connected to the first input power source Pin1 and a connection of the first output module 11 and the first conversion unit 21. The second switch SW2 is connected between the second conversion unit 22 and the second output module 12. When the management unit 40 determines that the first input power source Pin1 is normal, the first switch SW1 is turned on and the second switch SW2 is turned off. At this time, the first input power source Pin1 is available but the second input power source Pin2 is not available. Accordingly, the first input power source Pin1 is outputted from the first output module 11 and the second output module 12. When the management unit 40 determines that the first input power source Pin1 is abnormal, the first switch SW1 is turned off and the second switch SW2 is turned on. At this time, the first input power source Pin1 is not available so that the third input power source Pin3, which is converted from the second power source P2 by the first conversion unit 21, is outputted from the first output module 11. Also, the second input power source Pin2 is available so that the second input power source Pin2, which is converted from the second power source P2 by the second conversion unit 22, is outputted from the second output module 12. In this embodiment, the on/off conditions of the first switch SW1 and the second switch SW2 may be controlled by control signals provided by the management unit 40. Also, the first switch SW1 and the second switch SW2 may be controlled by control signals outputted from the first conversion unit 21 and the second conversion unit 22. In addition, the power distribution apparatus 100 further includes a third switch (not shown), which may be connected between the first output module 11 and the second output module 12. For example, the third switch is turned off to disconnect a connection between the first output module 11 and the second output module 12 so as to avoid mutually influencing each other when the third input power source Pin3 is outputted from the first output module 11 and the second input power source Pin2 is outputted from the second output module 12.

As shown in FIG. 1 and FIG. 2, the power distribution apparatus 100 further includes a transmission unit 60. The transmission unit 60 is connected to the management unit 40. The transmission unit 60 is used to transmit information of the management unit 40 or externally monitor the management unit 40. For example, an external interface (not shown) may be provided to set the power quality Qp or realize operations of the power distribution apparatus 100 and the quality of the energy storage unit 30 via the transmission unit 60. The transmission unit 60 may be externally connected to the management unit 40 or integrated inside the management unit 40.

In addition, the external interface may be used to output control signals to directly control the first switch SW1 and the second switch SW2, and the first conversion unit 21 and/or the second conversion unit 22. Furthermore, the external interface may be used to output control signals to the management unit 40, and the first switch SW1 and the second switch SW2, and the first conversion unit 21 and/or the second conversion unit 22 are controlled by the management unit 40. In addition, the first alerting signal S1 may be displayed on the external interface via the transmission unit 60, or displayed on an alerting unit (not shown) connected to the management unit 40. The transmission unit 60 may be communicated with the external interface in a wired manner or a wireless manner via a serial communication link or an Internet network. In the present disclosure, the external interface for example but not limited to, a human-machine interface, a computer, or a handheld device. The external interface may be transmitted data with the power distribution apparatus 100 in a unidirectional communication to acquire operation conditions of the power distribution apparatus 100 or in a bidirectional communication to remotely control the power distribution apparatus 100 after acquiring operation conditions of the power distribution apparatus 100.

As shown in FIG. 1 and FIG. 2, the management unit 40 is connected to the first output module 11 and the second output module 12. The first output module 11 outputs first power source information Ss1 to the management unit 40 and the second output module 12 outputs second power source information Ss2 to the management unit 40. In one embodiment, the first power source information Ss1 or the second power source information Ss2 may be, for example but not limited to, an information related to an upper voltage threshold value, a lower voltage threshold value, an upper current threshold value, a lower current threshold value, a phase difference value, an upper frequency threshold value, a lower frequency threshold value, a lower power factor value, and an upper THD value of the first input power source Pin1. The management unit 40 outputs a third control signal Sc3 to control the first output module 11 by determining the first power source information Ss1. The management unit 40 outputs a third control signal Sc3 to control the first output module 11 by determining the first power source information Ss1. The management unit 40 outputs a fourth control signal Sc4 to control the second output module 12 by determining the second power source information Ss2. The user-customized unit 50 outputs a user-customized range Rc to the management unit 40. The management unit 40 determines whether the first power source information Ss1 and the second power source information Ss2 meet the user-customized range Rc. When the first power source information Ss1 or the second power source information Ss2 fails to meet the user-customized range Rc, the management unit 40 outputs a second alerting signal S2. The detailed operation of the user-customized range Rc, the third control signal Sc3 and the fourth control signal Sc4, and the second alerting signal S2 will be described hereinafter.

Figure 3:
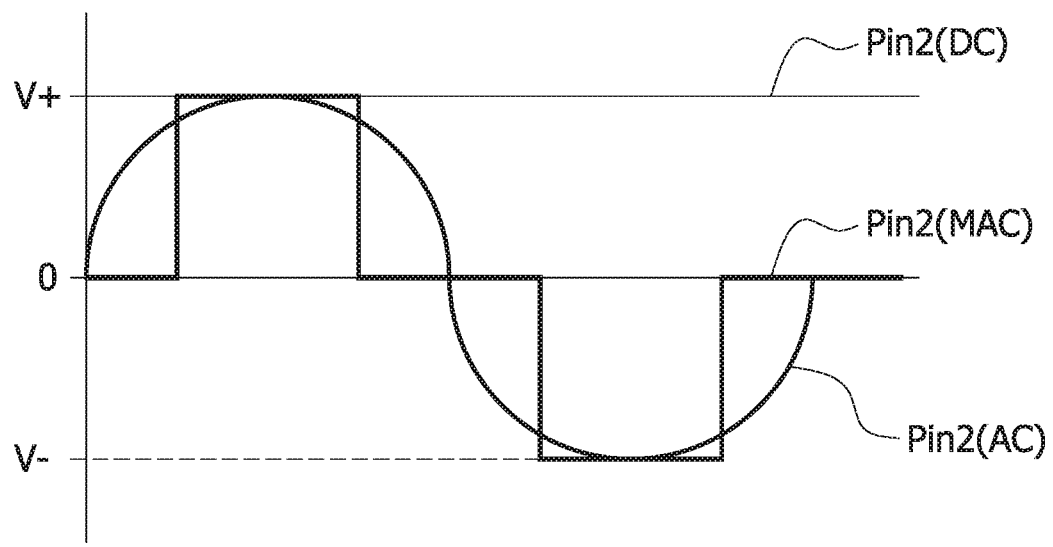
FIG. 3 is a schematic waveform diagram of outputting a second input power source from a second conversion unit according to the present disclosure.

Referring to FIG. 3, this figure shows a schematic waveform diagram of outputting a second input power source from a second conversion unit according to the present disclosure. As mentioned above and shown in FIG. 1 and FIG. 2, the second conversion unit 22 may be a DC-to-DC converter, a DC-to-AC converter, or the combination of the DC-to-DC converter and the DC-to-AC converter. When the second conversion unit 22 is the DC-to-DC converter and the first input power source Pin1 is abnormal, the second conversion unit 22 outputs the DC second input power source Pin2(DC). When the second conversion unit 22 is the DC-to-AC converter and the first input power source Pin1 is abnormal, the second conversion unit 22 outputs the AC second input power source Pin2 (AC) or the modulated AC second input power source Pin2 (modulated AC, MAC). When the second conversion unit 22 is the combination of the DC-to-DC converter and the DC-to-AC converter and the first input power source Pin1 is abnormal, the second conversion unit 22 outputs the DC second input power source Pin2 (DC), the AC second input power source Pin2 (AC), or the modulated AC second input power source Pin2 (modulated AC, MAC) by setting types of the second input power source Pin2 by the management unit 40, the external interface, or the user.

Figure 4:
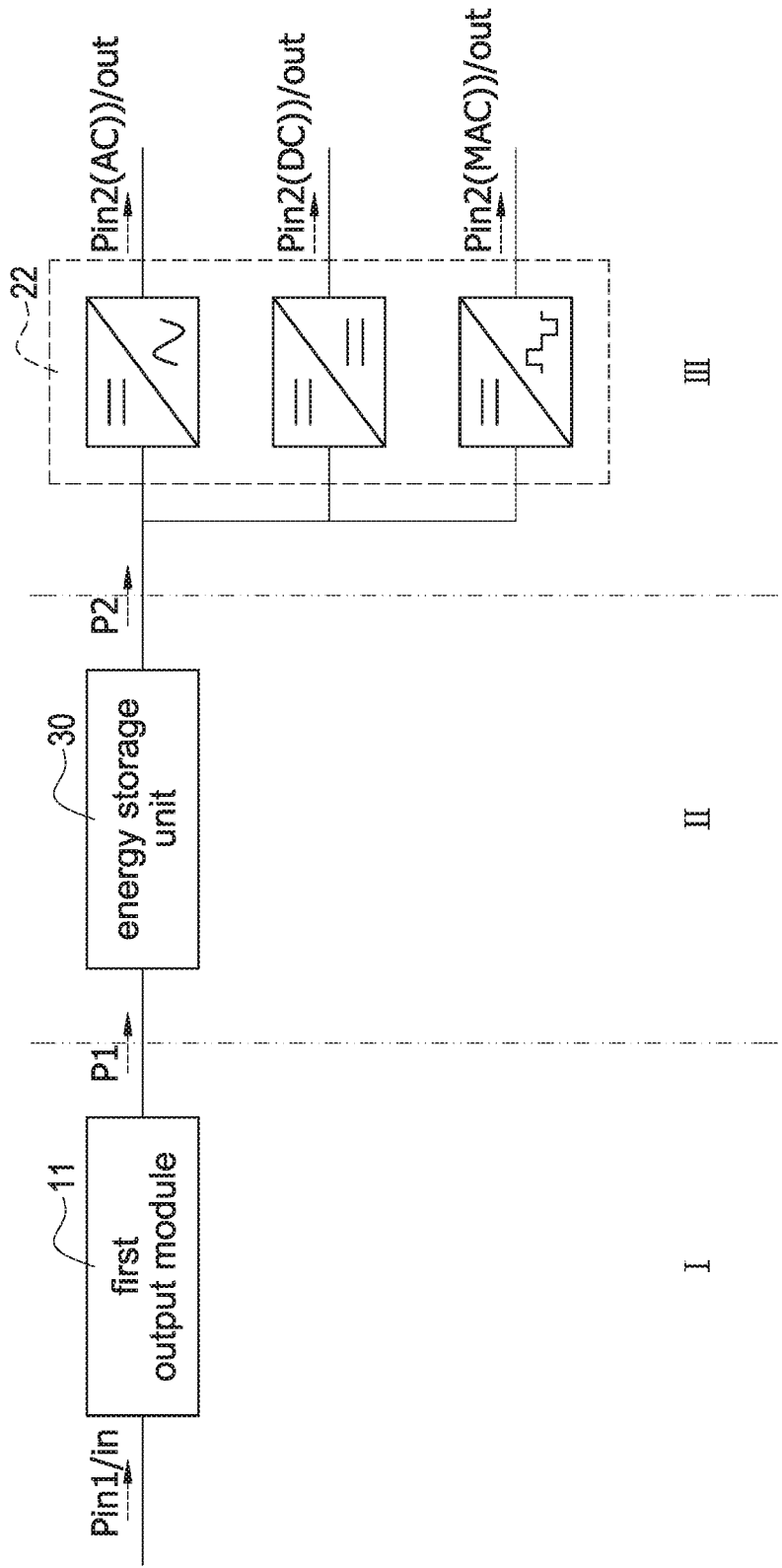
FIG. 4 is a schematic control architecture diagram of the power distribution apparatus according to the present disclosure.

Referring to FIG. 4, this figure shows a schematic control architecture diagram of the power distribution apparatus according to the present disclosure. The control architecture of the power distribution apparatus 100 has three stages. A first stage (I) is that: the first input power source Pin1 is converted into a first power source P1 by the first conversion unit 21 and the first input power source Pin1 is outputted from the first output module 11 after the power distribution apparatus 100 receives the first input power source Pin1. A second stage (II) is that: the first power source P1 is received and stored by the energy storage unit 30 to provide redundant power from the power distribution apparatus 100. A third stage (III) is that: a second power source P2 is converted into a second input power source Pin2 by the second conversion unit 22 and the second input power source Pin2 is outputted from the second output module 12 when the first input power source Pin1 is abnormal. In particular, the second input power source Pin2 may be a DC second input power source Pin2 (DC), an AC second input power source Pin2 (AC), or a modulated AC second input power source Pin2 (MAC) according to different types of converters, thereby providing flexible and adaptive operations for different types of loads.

Figure 5:
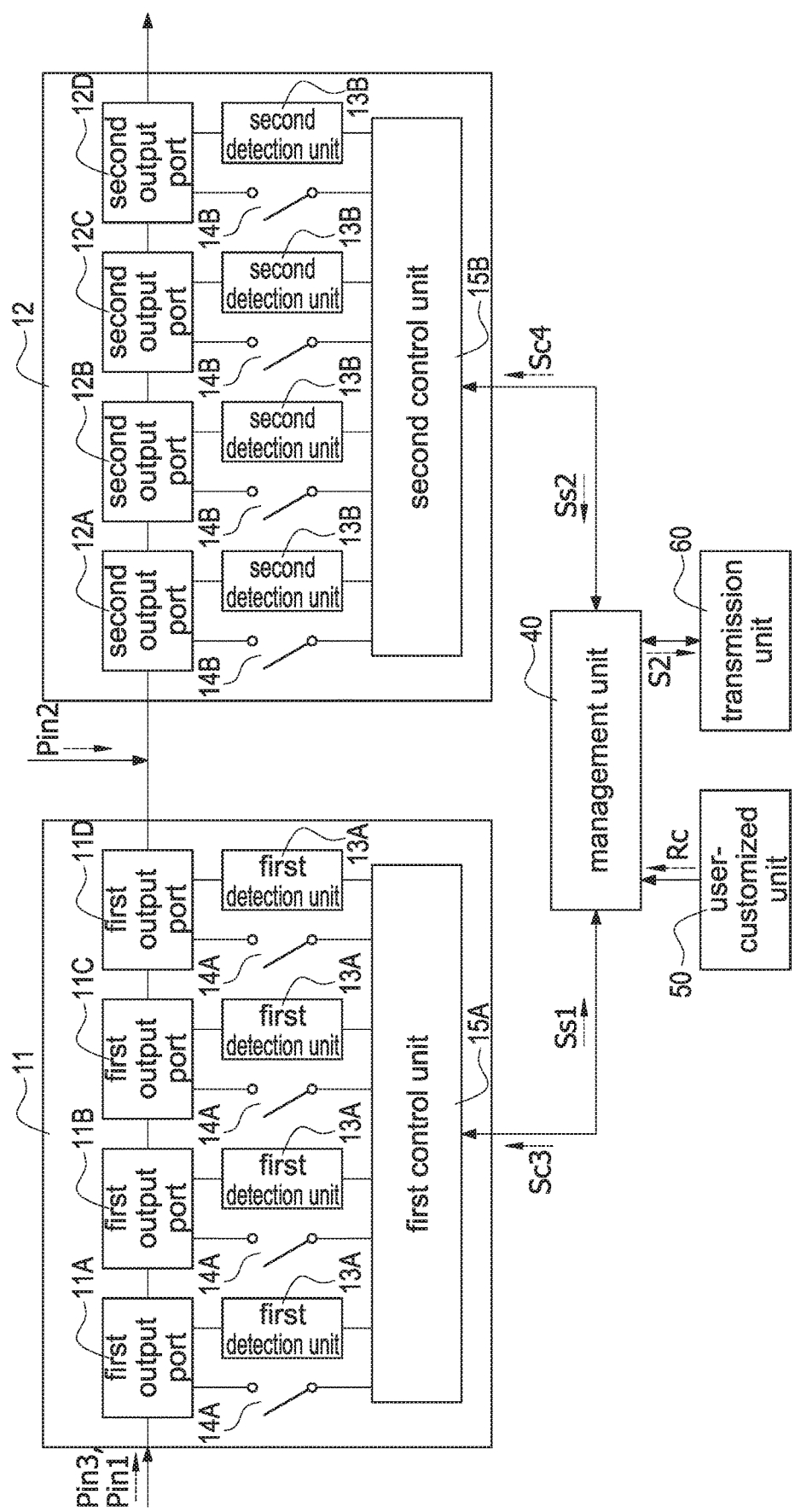
FIG. 5 is a schematic circuit block diagram of output modules according to the present disclosure.

Referring to FIG. 5, this figure shows a schematic circuit block diagram of output modules according to the present disclosure. The output module 10 includes the first output module 11 and the second output module 12. The first output module 11 receives the first input power source Pin1. The second output module 12 is connected to the conversion module 20. The second output module 12 receives the second input power source Pin2 through the conversion module 20 and receives the first input power source Pin1 through the first output module 11. The first output module 11 includes a plurality of first output ports 11A-11D, a plurality of first detection units 13A, a plurality of first switch units 14A, and a first control unit 15A. The second output module 12 includes a plurality of second output ports 12A-12D, a plurality of second detection units 13B, a plurality of second switch units 14B, and a second control unit 15B. The first output ports 11A-11D are connected in series and receive the first input power source Pin1. The second output ports 12A-12D are connected in series and receive the second input power source Pin2, and further receive the first input power source Pin1 by a connection path connecting the first output ports 11A-11D. Each first detection unit 13A and each first switch unit 14A are connected between each first output port 11A-11D and the first control unit 15A. Each second detection unit 13B and each second switch unit 14B are connected between each second output port 12A-12D and the second control unit 15B. The management unit 40 controls the first control unit 15A by the third control signal Sc3 and controls the second control unit 15B by the fourth control signal Sc4. When the first input power source Pin1 is supplied, the first detection units 13A and the second detection unit 13B detect information of the first input power source Pin1. The first control unit 15A and the second control unit 15B integrate the detected information of the first input power source Pin1 to be the first power source information Ss1 and the second power source information Ss2, respectively, and transmit the first power source information Ss1 and the second power source information Ss2 to the management unit 40. The management unit 40 receives the user-customized range Rc set by the user-customized unit 50 and determines whether the first power source information Ss1 and the second power source information Ss2 meet the user-customized range Rc. When the first power source information Ss1 fails to meet the user-customized range Rc, the management unit 40 outputs the third control signal Sc3 to the first control unit 15A. The first control unit 15A turns on the first switch unit/units 14A which fails/fail to the user-customized range Rc so that the corresponding first output port/ports 11A-11D are grounded to be turned off. Similarly, when the second power source information Ss2 fails to meet the user-customized range Rc, the management unit 40 outputs the fourth control signal Sc4 to the second control unit 15B. The second control unit 15B turns on the second switch unit/units 14B which fails/fail to meet the user-customized range Rc so that the corresponding second output port/ports 12A-12D are grounded to be turned off. In addition, when the first power source information Ss1 and/or the second power source information Ss2 fail to meet the user-customized range Rc, the management unit 40 outputs the second alerting signal S2 to notify the user of abnormal conditions of the power distribution apparatus 100. The second alerting signal S2 may be displayed on the external interface via the transmission unit 60, or displayed on the alerting unit connected to the management unit 40.

In one example, the first switch units 14A and the second switch units 14B are normally-open switch units, namely, the first switch units 14A and the second switch units 14B are turned off if the first switch units 14A and the second switch units 14B are not controlled. For example, when the first power source information Ss1 and the second power source information Ss2 meet the user-customized range Rc, the management unit 40 turns off the first switch units 14A and the second switch units 14B so that the first input power source Pin1 is outputted from the first output ports 11A-11D and the second output ports 12A-12D. In contrast, when the first power source information Ss1 and the second power source information Ss2 fail to meet the user-customized range Rc, the management unit 40 turns on the first switch unit/units 14A or the second switch unit/units which fails/fail to meet the user-customized range Rc so that the first input power source Pin1 is grounded. In another example, when the management unit 40 turns on the first switch units 14A and the second switch units 14B, the first input power source Pin1 is outputted from the first output ports 11A-11D and the second output ports 12A-12D. When the management unit 40 turns off the first switch units 14A and the second switch units 14B, the first input power source Pin1 is grounded and not outputted from the first output ports 11A-11D and the second output ports 12A-12D.

The first detection units 13A correspondingly detect voltage values, current values, phase values, frequency values, apparent power values, and active power values of the first input power source Pin1 outputted from the first output ports 11A-11D. The second detection units 13B correspondingly detect voltage values, current values, phase values, frequency values, apparent power values, and active power values of the first input power source Pin1 outputted from the second output ports 12A-12D. The first control unit 15A and the second control unit 15B calculate the power factor (PF) and the total harmonic distortion (THD) of the first input power source Pin1. The above-mentioned detected and calculated values are as the first power source information Ss1 and the second power source information Ss2, and the first power source information Ss1 and the second power source information Ss2 are outputted to the management unit 40. The user-customized range Rc is set to meet default factory settings by the user-customized unit 50. For example, the user-customized range Rc includes, for example but not limited to, an upper voltage threshold value, a lower voltage threshold value, an upper current threshold value, a lower current threshold value, a phase difference value, an upper frequency threshold value, a lower frequency threshold value, a lower power factor value, and an upper THD value of the first input power source Pin1. For example, it is assumed that the lower power factor value for the first output port 11A is 0.8 and for the remaining first output ports 11B-11D is 0.7. When the first control unit 15A acquires that the power factor of the first input power source Pin1 is 0.75, the first control unit 15A outputs the first power source information Ss1 to the management unit 40. According to the first power source information Ss1, the management unit 40 determines that the power factor of the first input power source Pin1 outputted from the first output port 11A fails to meet the user-customized range Rc. Also, the management unit 40 outputs the third control signal Sc3 to the first control unit 15A. Accordingly, the first control unit 15A turns on the first switch unit 14A connected to the first output port 11A according to the third control signal Sc3 so as to disable the first output port 11A.

Besides the first power source information Ss1 and the second power source information Ss2, the first detection units 13A and the second detection unit 13B further detect a variation range of voltage or current of the first input power source Pin1 during a predetermined time period, and transmit detected results to the management unit 40. The management unit 40 determines whether the detected results meet the user-customized range Rc. For example, the user-customized range Rc is set to a voltage variation (30 volts) of the first input power source Pin1 during a predetermined time period (5 minutes).

Besides the voltage value, the current value, the phase value, frequency value, the apparent power value, and the active power value of the first input power source Pint, the first detection unit 13A and the second detection unit 13B further detect other power parameters of the first input power source Pint. Hence, the first power source information Ss1 and the second power source information Ss2 further include the power parameters detected by the first detection unit 13A and the second detection unit 13B.

As mentioned above, the second input power source Pin2 may be the DC second input power source, the AC second input power source, or the modulated AC second input power source, and second input power source Pin2 is outputted from the second output ports 12A-12D. In this embodiment, different types of the second input power source Pin2 may be outputted from the second output ports 12A-12D. For example, the DC second input power source is outputted from the second output port 12A, and the AC second input power source or the modulated AC second input power source is/are outputted from another/other second output port/ports.

Figure 6:
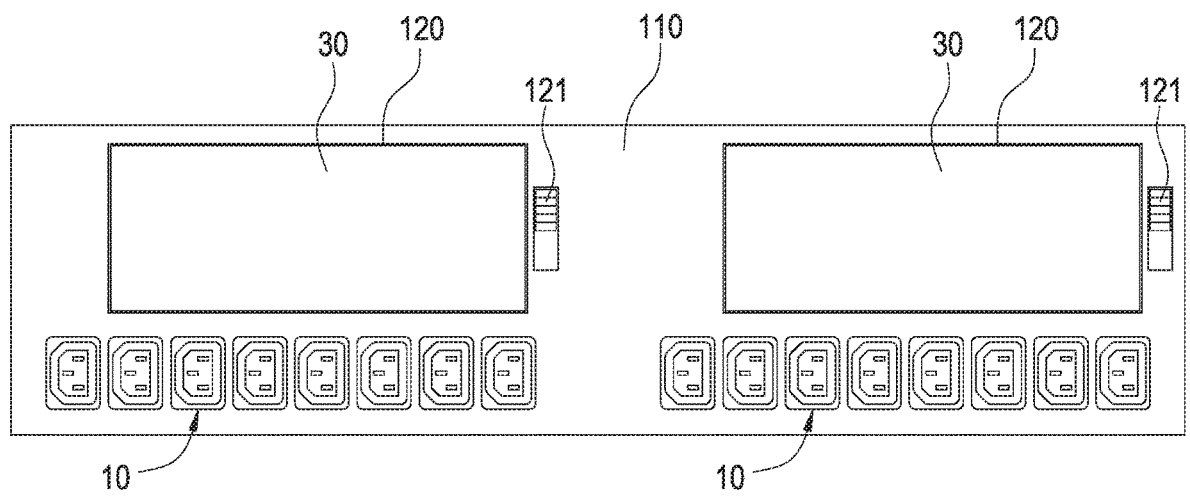
FIG. 6 is a schematic plan view of the power distribution apparatus according to the present disclosure.

Referring to FIG. 6, this figure shows a schematic plan view of the power distribution apparatus according to the present disclosure. The power distribution apparatus 100 further includes a housing 110. The housing 110 is provided to contain the output modules 10, the conversion modules 20, and the management unit 40. The output modules 10 are exposed to and located on a surface of the housing 110 for connecting external loads (not shown). The housing 110 provides a containing space 120 for containing and replacing or expanding the energy storage unit 30. The energy storage unit 30 is a pluggable energy storage unit. When the user realizes that the energy storage unit 30 fails by information from the management unit 40 or the external interface, the user may operate a clamping element 121 to open the containing space 120, and further take out the failed energy storage unit 30 from the containing space 120 without using any tools. Afterward, the user installs an energy storage unit 30 which is failed inside the containing space 120 of the housing 110 and operates the clamping element 121 to close the containing space 120 so that the energy storage unit 30 is connected between the conversion modules 20 and the management unit 40. In one embodiment, the power distribution apparatus 100 may be integrated with cabinets inside a server system for conveniently managing the server system. Alternatively, the power distribution apparatus 100 may be used to a server system in a stand-alone manner for conveniently connecting loads outside the server system.

Figure 7:
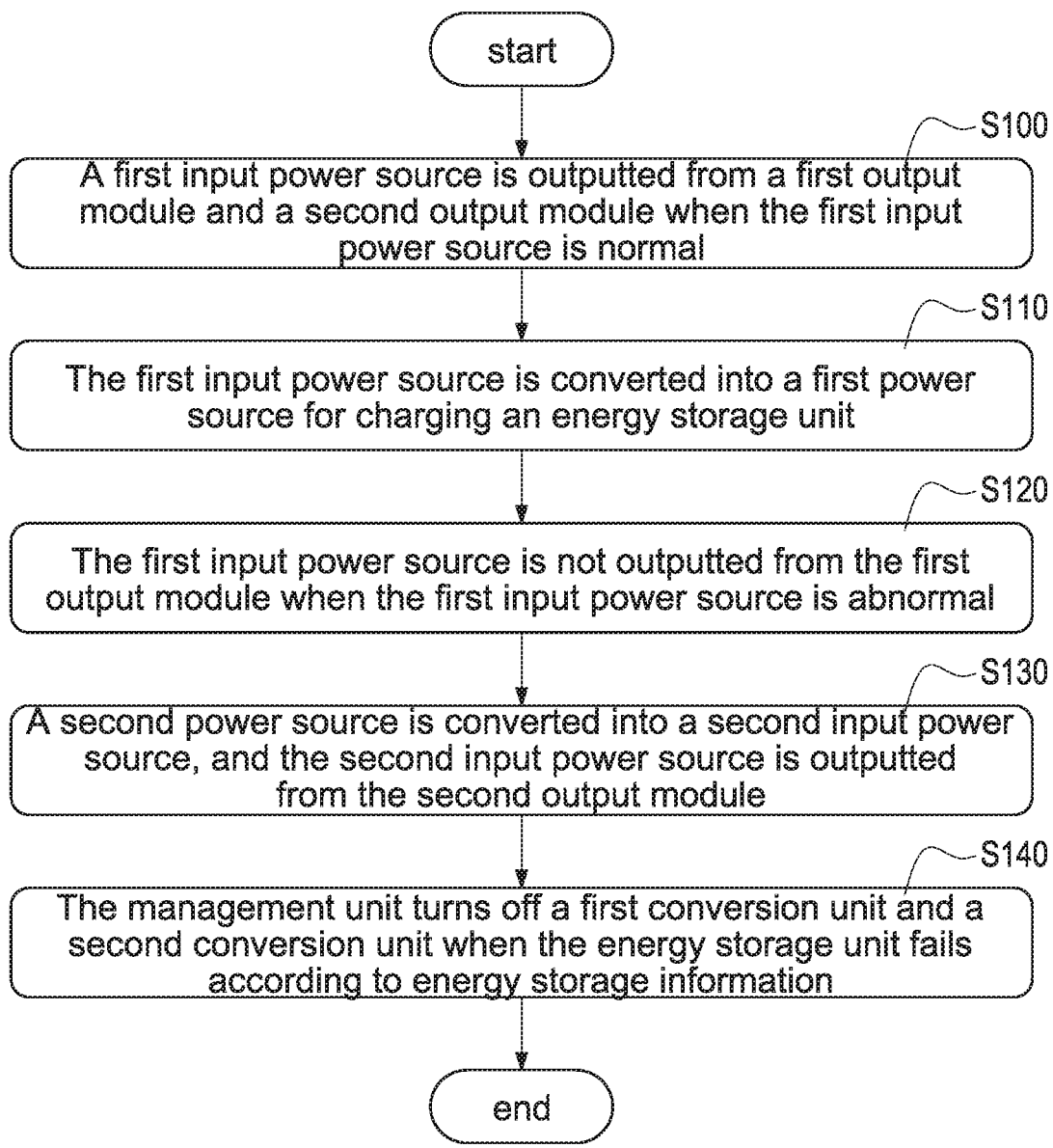
FIG. 7 is a flowchart of a method of operating a power distribution apparatus according to the present disclosure.

Referring to FIG. 7, this figure shows a flowchart of a method of operating a power distribution apparatus according to the present disclosure. The power distribution apparatus 100 controls a first output module 11 and a second output module 12 of an output module 10 to output a first input power source Pin1 and a second input power source Pin2 according to a status of the first input power source Pin1. The method includes steps as follows. First, the first input power source Pin1 is outputted from the first output module 11 and the second output module 12 when the first input power source Pin1 is normal (S100). When the power distribution apparatus 100 determines that the first input power source Pin1 meets a power quality Qp, the power distribution apparatus 100 turns on a first switch SW1 and turns off a second switch SW2 through a management unit 40 or an external interface (not shown) so that the first input power source Pin1 is distributed and outputted from the first output module 11 and the second output module 12. The power quality Qp includes, for example but not limited to, an upper voltage threshold value, a lower voltage threshold value, an upper current threshold value, a phase difference value, a power factor value, an upper frequency threshold value, and a lower frequency threshold value of the first input power source Pin1. Afterward, the first input power source Pin1 is converted into a first power source P1 for charging an energy storage unit 30 (S110). When the first input power source Pin1 is normal, the power distribution apparatus 100 converts the first power source P1 for charging an energy storage unit 30 (S110). When the first input power source Pin1 is normal, the first power source P1 is converted into a first power source by a first conversion unit 21 of the power distribution apparatus 100 and the first power source P1 is provided to charge an energy storage unit 30. Afterward, the first input power source Pin1 is not outputted from the first output module 11 when the first input power source Pin1 is abnormal (S120). When the power distribution apparatus 100 detects that the first input power source Pin1 fails to meet the power quality Qp, the power distribution apparatus 100 turns off the first switch SW1 through the management unit 40 or the external interface (not shown) so that the first input power source Pin1 is not outputted from the first output module 11. At this time, the first conversion unit 21 of the power distribution apparatus 100 converts a second power source P2 outputted from the energy storage unit 30 into a third input power source Pin3, and the third input power source Pin3 is outputted from the first output module 11. Finally, the second power source P2 outputted from the energy storage unit 30 is converted into the second input power source Pin2, and the second input power source Pin2 is outputted from the second output module 12 (S130). When the first input power source Pin1 is not outputted from the first output module 11, the power distribution apparatus 100 turns on the second switch SW2 through the management unit 40 or the external interface (not shown) so that the first input power source Pin1 is not outputted from the first output module 11. Also, the second conversion unit 22 is controlled to convert the second power source P2 into the second input power source Pin2, and the second input power source Pin2 is outputted from the second output module 12. When the first input power source Pin1 is abnormal, the second power source P2 outputted from the energy storage unit 30 is converted through a DC-to-DC converter of the second conversion unit 22 into a DC second input power source Pin2, and the DC second input power source Pin2 is outputted from the second output module 12. Alternatively, when the input power source Pin1 is abnormal, the second power source P2 outputted from the energy storage unit 30 is converted through a DC-to-AC converter of the second conversion unit 22 into an AC second input power source Pin2 or a modulated AC second input power source Pin2, and the AC second input power source Pin2 or the modulated AC second input power source Pin2 is outputted from the second output module 12. When the second conversion unit 22 is the combination of the DC-to-DC converter and the DC-to-AC converter and the first input power source Pin1 is abnormal, the second conversion unit 22 outputs the DC second input power source, the AC second input power source, or the modulated AC second input power source by setting types of the second input power source Pin2 by the management unit 40, the external interface, or the user.

During steps (S100)-(S130), the management unit 40 continuously determines the quality of the energy storage unit 30 so that the first conversion unit 21 and the second conversion unit 22 are turned off when the energy storage unit 30 fails according to energy storage information Sb (S140). When the management unit 40 determines that the energy storage unit 30 fails according to the energy storage information Sb during steps (S100)-(S130), the management unit 40 outputs a first control signal Sc1 and a second control signal Sc2 to control the first conversion unit 21 and the second conversion unit 22, respectively, and further outputs a first alerting signal S1. By measuring an inner resistance, a condition of a fixed-time discharge, a capacity, and times of charge and discharge of the energy storage unit 30, the management unit 40 determines whether the energy storage unit 30 fails. When the energy storage unit 30 fails, the management unit 40 turns off the first conversion unit 21 and the second conversion unit 22. The detailed operation of determining whether the energy storage unit 30 fails by the management unit 40 will be described hereinafter.

Figure 8:
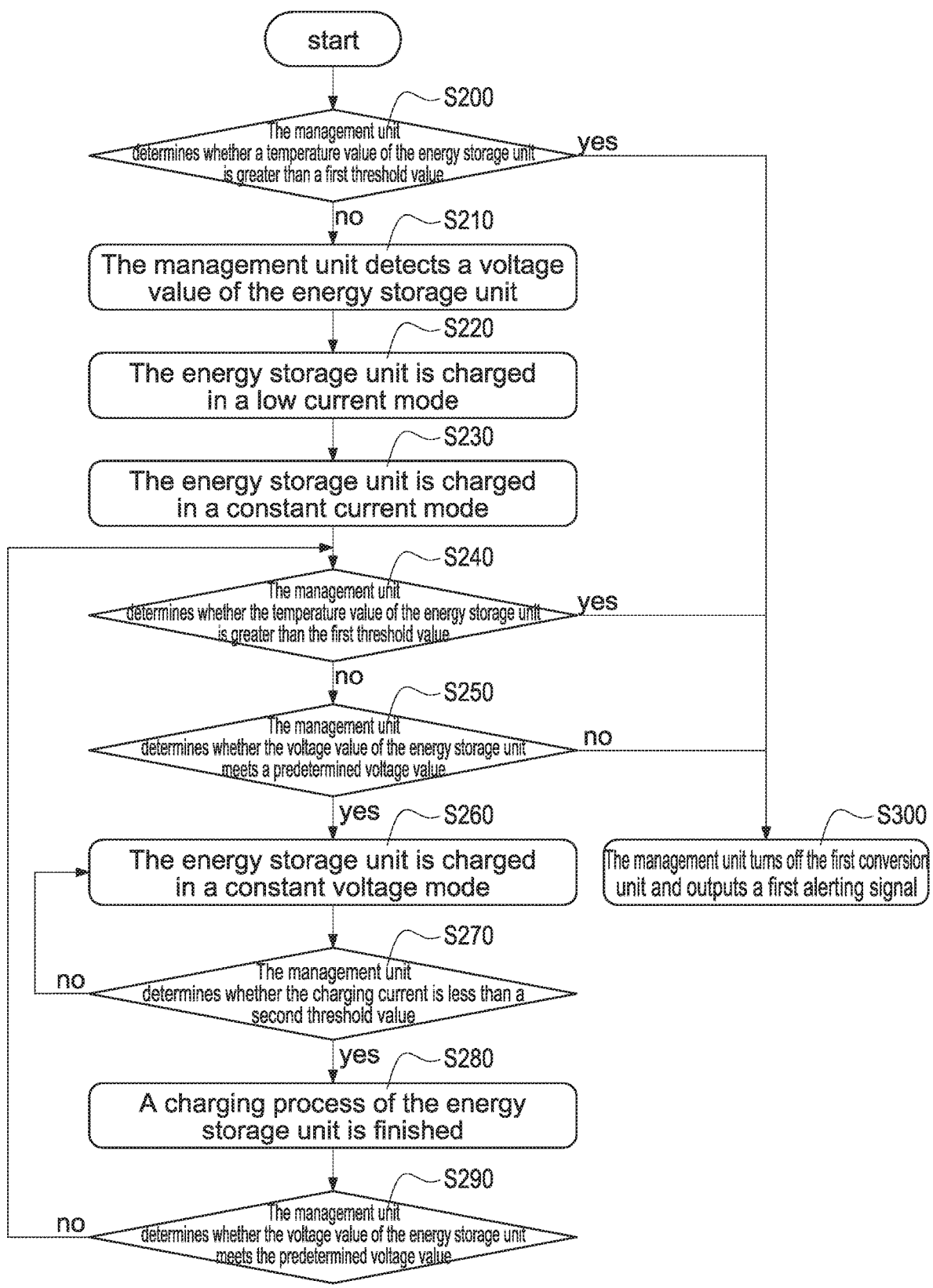
FIG. 8 is a flowchart of charging an energy storage unit according to the present disclosure.

Referring to FIG. 8, this figure shows a flowchart of charging an energy storage unit according to the present disclosure. The energy storage unit 30 is operated under a charging process and a discharging process. When the energy storage unit 30 is operated, the management unit 40 continuously determines whether the energy storage unit 30 is in a temperature abnormality or in a voltage abnormality. The charging process of the energy storage unit 30 includes steps as follows. First, the management unit 40 determines whether the temperature value of the energy storage unit 30 is greater than a first threshold value T1 (S200). When the energy storage unit 30 which is failed is installed inside the containing space 120 of the housing 110 and the clamping element 121 is operated to close the containing space 120, the management unit 40 detects whether the temperature value of the energy storage unit 30 is greater than the first threshold value T1. Preferably, the first threshold value T1 is 45 degrees Celsius. Afterward, the management unit 40 detects the voltage value of the energy storage unit 30 (S210) to determine the used charging manners. For example, the voltage value of the energy storage unit 30 is detected in a low voltage value. Afterward, the energy storage unit 30 is charged in a low current mode, also called a pre-charging mode (S220). For the initial charging, a low charging current is provided to charge the energy storage unit 30 for a period of time to avoid damaging the energy storage unit 30. Afterward, the energy storage unit 30 is charged in a constant current mode, also called a quick charting mode (S230). After the period of time of charging the energy storage unit 30 under the pre-charging mode, the first conversion unit 21 charges the energy storage unit 30 under the constant current mode so that the voltage value of the energy storage unit 30 is charged to a predetermined voltage value Vp. Preferably, the predetermined voltage value Vp is greater than or equal to 90% of the maximum chargeable voltage.

After the step (S230), the management unit 40 determines whether the temperature value and the voltage value of the energy storage unit 30 are normal or abnormal. Afterward, the management unit 40 determines whether the temperature value of the energy storage unit 30 is greater than the first threshold value T1 (S240) so as to avoid damaging the energy storage unit 30 due to an over-temperature operation. Afterward, the management unit 40 determines whether the voltage value of the energy storage unit 30 meets the predetermined voltage value Vp (S250). Accordingly, the temperature value and the voltage value of the storage energy unit 30 are detected and monitored during the constant current mode. Afterward, the energy storage unit 30 is charged in a constant voltage mode (S260). When the temperature value of the energy storage unit 30 is not greater than the first threshold value T1 and the voltage value of the energy storage unit 30 meets the predetermined voltage value Vp, the first conversion unit 21 charges the energy storage unit 30 under the constant voltage mode. Also, a charging current outputted from the first conversion unit 21 is continuously detected. Afterward, the management unit 40 determines whether the charging current is less than a second threshold value T2 (S270). In order to avoid damaging the energy storage unit 30 due to an overcharging operation, the first conversion unit 21 stops charging the energy storage unit 30 when the charging current is less than the second threshold value T2. Preferably, the second threshold value T2 is 0.05 Amperes. In the step (S270), when the management unit 40 determines that the charging current is greater than or equal to the second threshold value T2, the step (S260) is executed again so that the energy storage unit 30 is charged in the constant voltage mode. Until the charging current is less than the second threshold value T2, the charging process of the energy storage unit 30 is finished (S280). In other words, when the charging current is less than the second threshold value T2, it means that the energy storage unit 30 is nearly fully charged. Accordingly, the charging process of the energy storage unit 30 is completed and finished.

Afterward, the management unit 40 determines whether the voltage value of the energy storage unit 30 meets the predetermined voltage value Vp (S290). After the step (S280), the management unit 40 continuously detects the voltage value of the energy storage unit 30. When the management unit 40 determines that the voltage value of the energy storage unit 30 fails to meet the predetermined voltage value Vp, namely, the voltage value of the energy storage unit 30 is less than the predetermined voltage value Vp, the step (S240) and/or the step (S250) are/is executed again to determine whether the energy storage unit 30 is failed or not. In the present disclosure, the sequence of the step (S240) and the step (S250) may be exchanged according to actual requirements and considerations.

Finally, the first conversion unit 21 is turned off and the first alerting signal S1 is outputted by the management unit 40 (S300). When the temperature value of voltage value of the energy storage unit 30 is abnormal according to the determinations in the steps (S200), (S240), and (S250), the management unit 40 outputs the first control signal Sc1 to turn off the first conversion unit 21. Further, the management unit 40 outputs the first alerting signal S1 to a transmission unit 60 to notify the user that the energy storage unit 30 is failed. In other words, the management unit 40 turns off the first conversion unit 21 to stop outputting the first power source P1 when the management unit 40 determines that the temperature value of the energy storage unit 30 is greater than the first threshold value T1 before the energy storage unit 30 is charged or when the management unit 40 determines that the temperature value of the energy storage unit 30 is greater than the first threshold value T1 or the voltage value of the energy storage unit 30 fails to meet the predetermined voltage value Vp after the energy storage unit 30 is charged.

Figure 9:
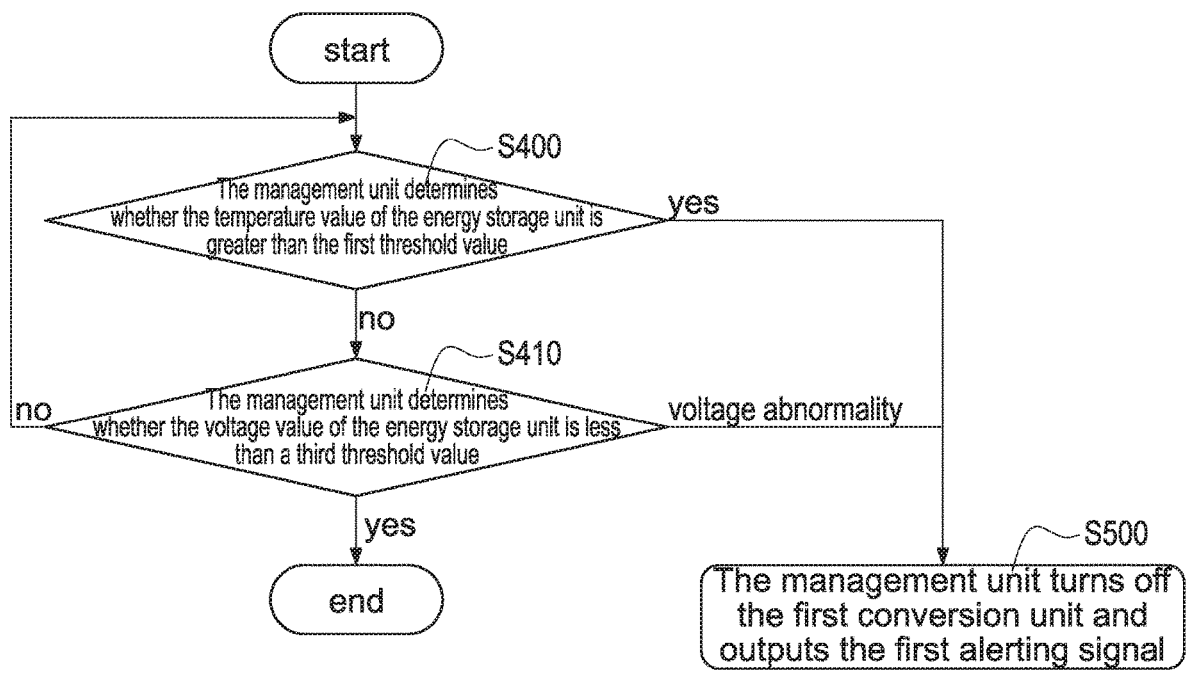
FIG. 9 is a flowchart of discharging the energy storage unit according to the present disclosure.

Referring to FIG. 9, this figure shows a flowchart of discharging the energy storage unit according to the present disclosure. The discharging process of the energy storage unit 30 includes steps as follows. First, the management unit 40 determines whether the temperature value of the energy storage unit 30 is greater than the first threshold value T1 (S400) so as to avoid damaging the energy storage unit 30 due to the over-temperature condition. When the temperature value of the energy storage unit 30 is not greater than the first threshold value T1, the management unit 40 determines whether the voltage value of the energy storage unit 30 is less than a third threshold value T3 (S410). If the voltage value of the energy storage unit 30 is not less than the third threshold value T3, the step (S400) is executed again and the energy storage unit 30 is continuously discharged. If the voltage value of the energy storage unit 30 is less than the third threshold value T3, it means that the energy storage unit 30 is nearly empty. Accordingly, the discharging process of the energy storage unit 30 is completed and finished. If the management unit 40 detects that the voltage value of the energy storage unit 30 is abnormal, it means that the energy storage unit 30 is probably damaged so that the first conversion unit 21 is turned off and the first alerting signal S1 is outputted (S500). In the step (S400) or the step (S410), when the management unit 40 determines that the temperature value or the voltage value of the energy storage unit 30 is abnormal, the management unit 40 outputs the first control signal Sc1 to turn off the first conversion unit 21 and outputs the second control signal Sc2 to turn off the second conversion unit 22 so as to stop receiving the second power source P2. The management unit 40 outputs the first alerting signal S1 to the transmission unit 60 to notify the user that the energy storage unit 30 is failed. In addition, when the management unit 40 determines that the charging process or the discharging process of the energy storage unit 30 is finished, the management unit 40 may notify the user via the transmission unit 60 or a display unit (not shown).

In conclusion, the present disclosure has the following advantages:

1. When the first input power source is abnormal, the energy storage unit is used to continuously and stably supply the required power to the loads of the power distribution apparatus. Also, the energy storage unit can be easily and conveniently replaced, expanded, or maintained by the user without using any tools.

2. It's configured to supply different types of loads with a DC, AC, or modulated AC second input power source Pin2 outputted from different types of converters.

3. The user-customized unit is used to customize and monitor parameters of the first input power source for the user so as to flexibly adjust configurations of the loads.

4. A detection mechanism is provided to detect the statues of the energy storage unit so as to protect the energy storage unit, and an alerting mechanism is activated once the energy storage unit fails.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power distribution apparatus, comprising:
a first output module configured to receive a first input power source;
a second output module connected to the first output module, and configured to receive the first input power source;
a conversion module connected to the first output module and the second output module, and configured to receive the first input power source;
an energy storage unit connected to the conversion module;
a management unit connected to the first output module, the second output module, the conversion module, and the energy storage unit;
wherein when the first input power source is normal, the first input power source is outputted from the first output module and the second output module, and the management unit is configured to control the conversion module to convert the first input power source into a first power source for charging the energy storage unit; when the first input power source is abnormal, the energy storage unit is configured to output a second power source to the conversion module, and the management unit is configured to control the conversion module to convert the second power source into a second input power source for outputting the second input power source from the second output module;
the first output module provides a first power source information to the management unit according to the first input power source and the second output module provides a second power source information to the management unit according to the first input power source; the management unit provides a third control signal to control the first output module according to the first power source information and provides a fourth control signal to control the second output module according to the second power source information.

2. The power distribution apparatus as claimed in claim 1, wherein the conversion module further comprises:
a first conversion unit connected to the energy storage unit and configured to receive the first input power source;
a second conversion unit connected between the energy storage unit and the second output module;
wherein the first conversion unit is configured to convert the first input power source into the first power source for charging the energy storage unit, and the second conversion unit is configured to convert the second power source into the second input power source and transmit the second input power source to the second output module.

3. The power distribution apparatus as claimed in claim 2, wherein the second conversion unit is a DC-to-DC converter or a DC-to-AC converter; when the second conversion unit is the DC-to-DC converter and the first input power source is abnormal, the second conversion unit is configured to convert the second power source into a DC second input power source and transmit the DC second input power source to the second output module; when the second conversion unit is the DC-to-AC converter and the first input power source is abnormal, the second conversion unit is configured to convert the second power source into an AC second input power source or a modulated AC second input power source and transmit the AC second input power source or the modulated AC second input power source to the second output module.

4. The power distribution apparatus as claimed in claim 2, wherein the second conversion unit comprises a DC-to-DC converter and a DC-to-AC converter, and the management unit is configured to set the second input power source is a DC second input power source, an AC second input power source, or a modulated AC second input power source; when the first input power source is abnormal, the second conversion unit is configured to transmit the DC second input power source, the AC second input power source, or the modulated AC second input power source to the second output module.

5. The power distribution apparatus as claimed in claim 2, wherein the first conversion unit is a bidirectional AC-to-DC converter; when the first input power source is abnormal, the first conversion unit is configured to convert the second power source into an AC third input power source and transmit the AC third input power source to the first output module.

6. The power distribution apparatus as claimed in claim 5, further comprising:
a first switch connected to the first output module and the first conversion unit, and configured to receive the first input power source;
a second switch connected between the second output module and the second conversion unit;
wherein when the first input power source is normal, the first switch is turned on and the second switch is turned off, and the first input power source is outputted from the first output module and the second output module; when the first input power source is abnormal, the first switch is turned off so that the first output module disconnects from the first input power source, and the second switch is turned on so that the second input power source is transmitted to the second output module through the second switch.

7. The power distribution apparatus as claimed in claim 5, wherein the first output module further comprises:

a plurality of first output ports;
a first control unit connected to the management unit;
a plurality of detection units correspondingly connected between the first output ports and the first control unit;
a plurality of first switch units correspondingly connected between the first output ports and the first control unit;
wherein the detection units are configured to detect information of the first input power source at the first output ports, the first control unit is configured to convert the information of the first input power source into the first power source information and output the first power source information to the management unit, and the management unit is configured to turn on or turn off the first switch units according to the first power source information.

8. The power distribution apparatus as claimed in claim 1, wherein the second output module further comprises:
a plurality of second output ports;
a second control unit connected to the management unit;
a plurality of detection units correspondingly connected between the second output ports and the second control unit;
a plurality of second switch units correspondingly connected between the second output ports and the second control unit;
wherein the detection units are configured to detect information of the first input power source at the second output ports, the second control unit is configured to convert the information of the first input power source into the second power source information and output the second power source information to the management unit, and the management unit is configured to turn on or turn off the second switch units according to the second power source information.

9. The power distribution apparatus as claimed in claim 1, further comprising:
a user-customized unit connected to the management unit and configured to set a power quality of the first input power source; the management unit is configured to determine a status of the first input power source according to the power quality.

10. The power distribution apparatus as claimed in claim 9, wherein the power quality comprises an upper voltage threshold value, a lower voltage threshold value, an upper current threshold value, a phase difference value, a power factor value, an upper frequency threshold value, and a lower frequency threshold value of the first input power source.

11. The power distribution apparatus as claimed in claim 2, wherein the energy storage unit is configured to output energy storage information to the management unit, and the management unit is configured to turn off the first conversion unit and the second conversion unit when the management unit is configured to determine that the energy storage unit fails, in a temperature abnormality, or in a voltage abnormality according to the energy storage information.

12. The power distribution apparatus as claimed in claim 1, further comprising:
a housing configured to contain the first output module, the second output module, the conversion module, and the management unit; wherein the housing has a containing space for containing and replacing or expanding the energy storage unit.

13. The power distribution apparatus as claimed in claim 10, wherein the energy storage unit is a pluggable energy storage unit.

14. The power distribution apparatus as claimed in claim 1, further comprising:
a transmission unit connected to the management unit, and configured to transmit information of the management unit or monitor and control the management unit.

15. A method of operating a power distribution apparatus, the power distribution apparatus configured to control power output from a first output module and a second output module of the power distribution apparatus according to a status of a first input power source, the method comprising steps of:
(a01) providing, by the first output module, a first power source information according to the first input power source and providing, by the second output module, a second power source information according to the first input power source;
(a02) providing a third control signal to control the first output module according to the first power source information and providing a fourth control signal to control the second output module according to the second power source information;
(a) outputting the first input power source from the first output module and the second output module when the power distribution apparatus detects that the first input power source is normal;
(b) converting the first input power source into a first power source by the power distribution apparatus for charging an energy storage unit;
(c) controlling the first output module not to output the first input power source by the power distribution apparatus when the power distribution apparatus detects that the first input power source is abnormal;
(d) converting a second power source provided from the energy storage unit into a second input power source by the power distribution apparatus for outputting the second input power source from the second output module.

16. The method of operating the power distribution apparatus as claimed in claim 15, wherein the step (d) further comprises:
(d1) converting the second power source provided from the energy storage unit into a DC second input power source by a second conversion unit and outputting the DC second input power source from the second output module when the first input power source is abnormal; or converting the second power source provided from the energy storage unit into an AC second input power source or a modulated AC second input power source by a second conversion unit and outputting the AC second input power source or the modulated AC second input power source from the second output module when the first input power source is abnormal.

17. The method of operating the power distribution apparatus as claimed in claim 15, wherein the step (d) further comprises:
(d2) converting the second power source provided from the energy storage unit into a DC second input power source, an AC second input power source, or a modulated AC second input power source according to a setting of a management unit by a second conversion unit, and outputting the DC second input power source, the AC second input power source, or the modulated AC second input power source from the second output module when the first input power source is abnormal.

18. The method of operating the power distribution apparatus as claimed in claim 16, wherein after the step (c) further comprises:

(c1) converting the second power source into an AC third input power source by a first conversion unit and outputting the AC third input power source from the first output module when the first input power source is abnormal.

19. The method of operating the power distribution apparatus as claimed in claim 18, wherein the power distribution apparatus is configured to turn off the first conversion unit and the second conversion unit when the power distribution apparatus determines that the energy storage unit fails, in a temperature abnormality, or in a voltage abnormality according to the energy storage information.

20. The method of operating the power distribution apparatus as claimed in claim 15, wherein the power distribution apparatus comprises a user-customized unit, and the user-customized unit is configured to set a power quality of the first input power source; the management unit is configured to determine the status of the first input power source according to the power quality; the power quality comprises an upper voltage threshold value, a lower voltage threshold value, an upper current threshold value, a phase difference value, a power factor value, an upper frequency threshold value, and a lower frequency threshold value of the first input power source.

* * * * *